(12) United States Patent
Blueml

(10) Patent No.: US 10,766,084 B2
(45) Date of Patent: Sep. 8, 2020

(54) JOINING DEVICE AND METHOD FOR PRODUCING AN EXHAUST GAS SYSTEM

(71) Applicant: Faurecia Emissions Control Technologies, Germany GmbH, Augsburg (DE)

(72) Inventor: Alfred Blueml, Gruenwald (DE)

(73) Assignee: Faurecia Emissions Control Technologies, Germany GmbH (DE)

(*) Notice: Subject to any disclaimer, the term of this patent is extended or adjusted under 35 U.S.C. 154(b) by 230 days.

(21) Appl. No.: 15/914,117

(22) Filed: Mar. 7, 2018

(65) Prior Publication Data
US 2018/0264574 A1   Sep. 20, 2018

(30) Foreign Application Priority Data
Mar. 17, 2017  (DE) ........................ 10 2017 105 821

(51) Int. Cl.
*B23K 1/002*   (2006.01)
*B23K 1/14*   (2006.01)
(Continued)

(52) U.S. Cl.
CPC ............ *B23K 1/002* (2013.01); *B23K 1/0008* (2013.01); *B23K 1/19* (2013.01); *B23K 3/0475* (2013.01); *B23K 3/08* (2013.01); *B23K 3/087* (2013.01); *B23K 37/02* (2013.01); *F01N 13/18* (2013.01); *F01N 13/1838* (2013.01);
(Continued)

(58) Field of Classification Search
CPC .. B23K 1/0008; B23K 1/002; B23K 1/14–18; B23K 13/00–025; B23K 37/00–025; B23K 37/02–0294; B23K 37/04–0417; B23K 37/053–0538
See application file for complete search history.

(56) References Cited

U.S. PATENT DOCUMENTS 5,063,659 A * 11/1991 Wright ................... H01R 24/40
                                                                29/860
5,165,160 A * 11/1992 Poncelet ............ B23K 37/0533
                                                                228/49.3
(Continued)

FOREIGN PATENT DOCUMENTS

DE      102006009952 A1    9/2007
WO   WO 2016/153562 A1 *   9/2016

OTHER PUBLICATIONS

English translation of EP0113267 to Sabonnadiere (Year: 1986).*
German Search Report in connection with German Priority Application No. 102017105821.4 dated Apr. 19, 2017.

*Primary Examiner* — Michael A Laflame, Jr.
(74) *Attorney, Agent, or Firm* — Carlson, Gaskey & Olds, P.C.

(57) ABSTRACT

A joining device for producing an exhaust gas system for an internal combustion engine comprises a device base, a frame, and at least two joining units that can be operated simultaneously are fastened to the frame. The frame extends essentially vertically starting from the device base. In a method for producing the exhaust gas system, at least one joining unit of a joining device is oriented to a geometry of the exhaust gas system that is to be produced, at least three components or assemblies of the exhaust gas system are positioned in the joining device, and the components or assemblies are simultaneously connected.

20 Claims, 2 Drawing Sheets

(51) Int. Cl.
  *B23K 37/02* (2006.01)
  *B23K 37/04* (2006.01)
  *B23K 37/053* (2006.01)
  *B23K 1/19* (2006.01)
  *B23K 3/047* (2006.01)
  *F01N 13/18* (2010.01)
  *B23K 3/08* (2006.01)
  *B23K 1/00* (2006.01)
  *B23K 101/06* (2006.01)
  *B23K 101/00* (2006.01)

(52) U.S. Cl.
  CPC .... *B23K 2101/006* (2018.08); *B23K 2101/06* (2018.08); *F01N 2450/22* (2013.01)

(56) References Cited

U.S. PATENT DOCUMENTS

| | | | |
|---|---|---|---|
| 5,290,984 A * | 3/1994 | Gerhard, Jr. | B23K 1/002 219/616 |
| 5,338,072 A | 8/1994 | Bitter et al. | |
| 6,847,001 B2 * | 1/2005 | Ananthanarayanan | B23K 11/02 219/59.1 |
| 2009/0261574 A1 | 10/2009 | Blueml et al. | |
| 2011/0114216 A1 | 5/2011 | Blueml et al. | |
| 2014/0197631 A1 | 7/2014 | Blueml | |
| 2014/0201989 A1 * | 7/2014 | Paynter | H01R 4/024 29/828 |

* cited by examiner

JOINING DEVICE AND METHOD FOR PRODUCING AN EXHAUST GAS SYSTEM

CROSS-REFERENCE TO RELATED APPLICATIONS

This application claims priority to DE 10 2017 105 821.4, filed Mar. 17, 2017.

FIELD OF THE INVENTION

The invention relates to a joining device for producing an exhaust gas system for an internal combustion engine of a motor vehicle. Moreover, the invention relates to a method for producing an exhaust gas system for an internal combustion engine of a motor vehicle.

BACKGROUND

It is known from the prior art to use joining methods in the production of exhaust gas systems. In particular, the components of an exhaust gas system are arranged in a joining device and connected to one another.

The common joining methods are welding and soldering. In this context, by way of example DE 10 2011 106 801 A1, DE 10 2004 038 099 A1 and DE 10 2012 000 439 A1 disclose induction soldering devices that make it possible to join components of an exhaust gas system.

Altogether, in light of the high cost pressure in the production of exhaust gas systems, the requirement is to provide the joining devices and also the methods for producing exhaust gas systems as efficiently as possible. This applies on the one hand with regards to the time that is required in order to produce an exhaust gas system, more precisely, in order to join the components of an exhaust gas system. This time is to be as short as possible. On the other hand, the devices and methods are to involve investment costs and operating costs that are as low as possible. In this context, joining devices are to be constructed in a simple manner but they are simultaneously to be suitable for producing as many variants of an exhaust gas system as possible.

There is therefore a need to further improve known joining devices and methods for producing exhaust gas systems. In particular, a joining device and a method are to be provided that are improved with regards to the above-mentioned efficiency criteria.

SUMMARY

A joining device comprises a device base that is configured to be positioned on a production hall floor, and a frame to which least two joining units are fastened, and which are adapted to be operated simultaneously. The frame extends essentially vertically starting from the device base. It is possible by virtue of simultaneously operating the joining units to simultaneously join multiple joining interfaces between components that are to be connected to each other. In comparison to the approach of successively joining the components, it is therefore also possible to produce the exhaust gas system within a much shorter time period. Moreover, in the case of the joining device in accordance with the invention, it is not necessary to clamp the components that are to be joined. This also saves time. An exhaust gas system that is to be processed in the joining device is also essentially arranged vertically by virtue of the vertical arrangement of the frame. Consequently, the joining device only requires a relatively small footprint. It is consequently possible to use a production hall more efficiently. Moreover, the joining interfaces can be positioned in an advantageous manner with respect to gravity via the vertical arrangement of the frame. This is in particular advantageous when using a soldering method as a joining method since the solder can flow under the influence of gravity into the joining interface.

It is preferred that the joining units are induction soldering units. Each of the joining units comprises an inductor. In comparison to the welding method, it is possible to achieve relatively short process times using the induction soldering method. Moreover, the short process times are essentially independent of the length of the joint or a diameter of pipes that are to be joined. Furthermore, the induction soldering method comprises the advantage that notching effects are not produced in the region of the joining interface, with the result that a particularly stable connection is produced. Moreover, vapors that would otherwise require extracting do not occur. Investment costs are therefore saved. Moreover, the induction soldering procedure is a particularly reliable and robust method with which it is possible to ensure joins of uniform quality.

Each of the joining units can be positioned along a translational axis or multiple translational axes relative to the frame. In particular, each of the joining units is connected to the frame via three linear drive units that operate perpendicular to one another and each of the linear drive units comprises an electrical drive unit. These linear drive units are therefore electrically-operated linear drive units. Colloquially, these are also referred to as electrical linear axes. Both rack and pinion drives that are operated electro-mechanically as well as purely electrical linear drive units are possible. The joining units can therefore be positioned within the space in a translational manner. Consequently, it is possible to adjust the positions of the joining units to different positions of joining interfaces in a rapid and simple manner. As a consequence, it is possible via the joining device to process a large spectrum of variants of exhaust gas systems. The joining device can therefore be used in a particularly flexible manner, as a result of which it is possible to operate the joining device at a high utilization rate.

Each of the joining units can also be positioned rotationally about a rotational axis or multiple rotational axes relative to the frame. In particular, each of the joining units is connected to the frame via three electrically rotational adjustment drives having rotational axes that operate perpendicular to one another. The advantages and effects that are mentioned with regards to the possibility of positioning the joining units in a translational manner also apply in a similar manner. It is particularly advantageous if each of the joining units can be positioned both in a translational as well as in a rotational manner in three degrees of freedom. It is possible for the joining units to be positioned freely within the space. The joining device is consequently particularly very flexible.

The joining units are advantageously arranged essentially one above the other in a vertical direction. The exhaust gas system, more precisely the components of the exhaust gas system that are to be joined, is/are arranged essentially vertically. As a consequence, only a small footprint of the joining device is required. It is consequently possible to position a particularly high number of joining devices on a predetermined surface area and it is consequently possible to simultaneously produce many exhaust gas systems. The flow of the solder into the joining interface can also be facilitated by virtue of a vertical arrangement.

In accordance with one embodiment, the joining device comprises one or multiple clamping units, preferably wherein a number of clamping units corresponds to at least a number of components or assemblies of the exhaust gas system that are to be joined. The components of the exhaust gas system that are to be joined are held in the joining device via the clamping units. It is therefore possible to position the components that are to be joined relative to one another in such a manner that it is possible to produce joining interfaces of a high quality.

In accordance with one variant, each of the clamping units can be adjusted in three rotational and three translational degrees of freedom. It is therefore possible for the joining units to be positioned freely within the space. As a consequence, it is possible to adjust the position and orientation of the clamping units to different variants of exhaust gas systems that are to be produced. Thus, the joining device is suitable for universal use.

The clamping units can be electrically actuated, in particular can be electrically activated and can be electrically deactivated. In the activated state, the clamping units clamp a component or an assembly. In the deactivated state, the clamping units release the component or the assembly. The clamping units can be vacuum clamping units. The clamping units can be connected simultaneously and with little effort by the electrical actuation. As a consequence, an exhaust gas system or its components can be rapidly and simply clamped in the joining device, or can be removed from the joining device.

In a further development, the joining device comprises a soldering current generator having multiple soldering current outputs, wherein each soldering current output is coupled to a joining unit and preferably corresponds to a number of joining units. Therefore, only a single soldering current generator is required. In spite of this, it is possible to simultaneously operate multiple joining units. As a consequence, an exhaust gas system may be produced in a very short time period.

It is preferred that a number of joining units corresponds to a number of joining interfaces of the exhaust gas system. A joining unit is allocated to each joining interface. It is consequently possible for all the joining interfaces to be processed simultaneously.

The joining device may comprise three to fifteen, in particular five to twelve joining units. This number corresponds to the number of joining interfaces of common exhaust gas systems. The joining device may consequently be used to produce common exhaust gas systems. All the joining interfaces may consequently be processed simultaneously.

Moreover, the object is achieved by a method for producing an exhaust gas system for an internal combustion engine of a motor vehicle, said method comprising the following steps:

electromechanically orienting at least one joining unit of a joining device to a geometry of the exhaust gas system that is to be produced, positioning at least three components or assemblies of the exhaust gas system in the joining device, wherein the components or assemblies form at least two joining interfaces between one another, and simultaneously connecting the components or assemblies at the joining interfaces by using an induction soldering method.

This method may therefore be used for a plurality of different exhaust gas systems. The positioning of the components may also include fixing the components in the joining device. It is possible to produce the exhaust gas system in a very short time period, in particular by producing the joins simultaneously. It is therefore possible to omit the step of clamping the components that are to be joined.

The joining units may be oriented along one or multiple rotational axes and/or one or multiple translational axes, preferably in six degrees of freedom within the space.

In accordance with a further development, in step a) at least one clamping unit of the joining device is also oriented along one or multiple rotational axes and/or one or multiple translational axes to the geometry of the exhaust gas system that is to be produced, preferably in six degrees of freedom within the space.

It is preferred that the joining interfaces are arranged essentially one above the other in a vertical direction.

BRIEF DESCRIPTION OF THE DRAWINGS

The invention is explained below with reference to an exemplary embodiment that is illustrated in the attached drawings. In the figures.

DETAILED DESCRIPTION

Figure 1:
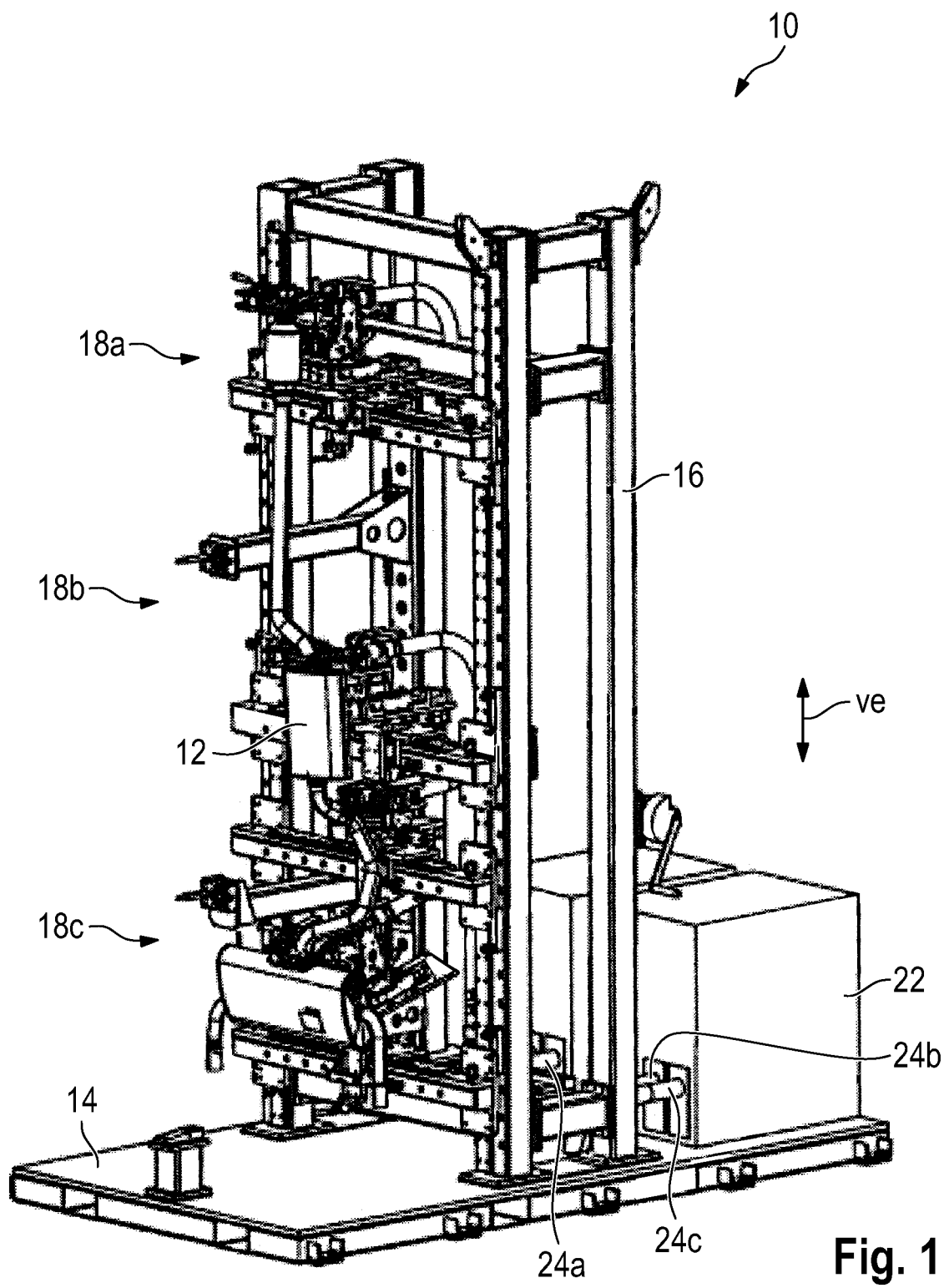
FIG. 1 illustrates a joining device in accordance with the invention that may be used to perform a method in accordance with the invention for producing an exhaust gas system.

FIG. 1 illustrates a joining device 10 for producing an exhaust gas system 12. The exhaust gas system 12 is arranged in the joining device 10.

The joining device 10 comprises a device base 14 that is configured to be positioned on a production hall floor (not further illustrated), and a frame 16 that extends essentially vertically (cf. ve) starting from the device base 14.

Figure 2:
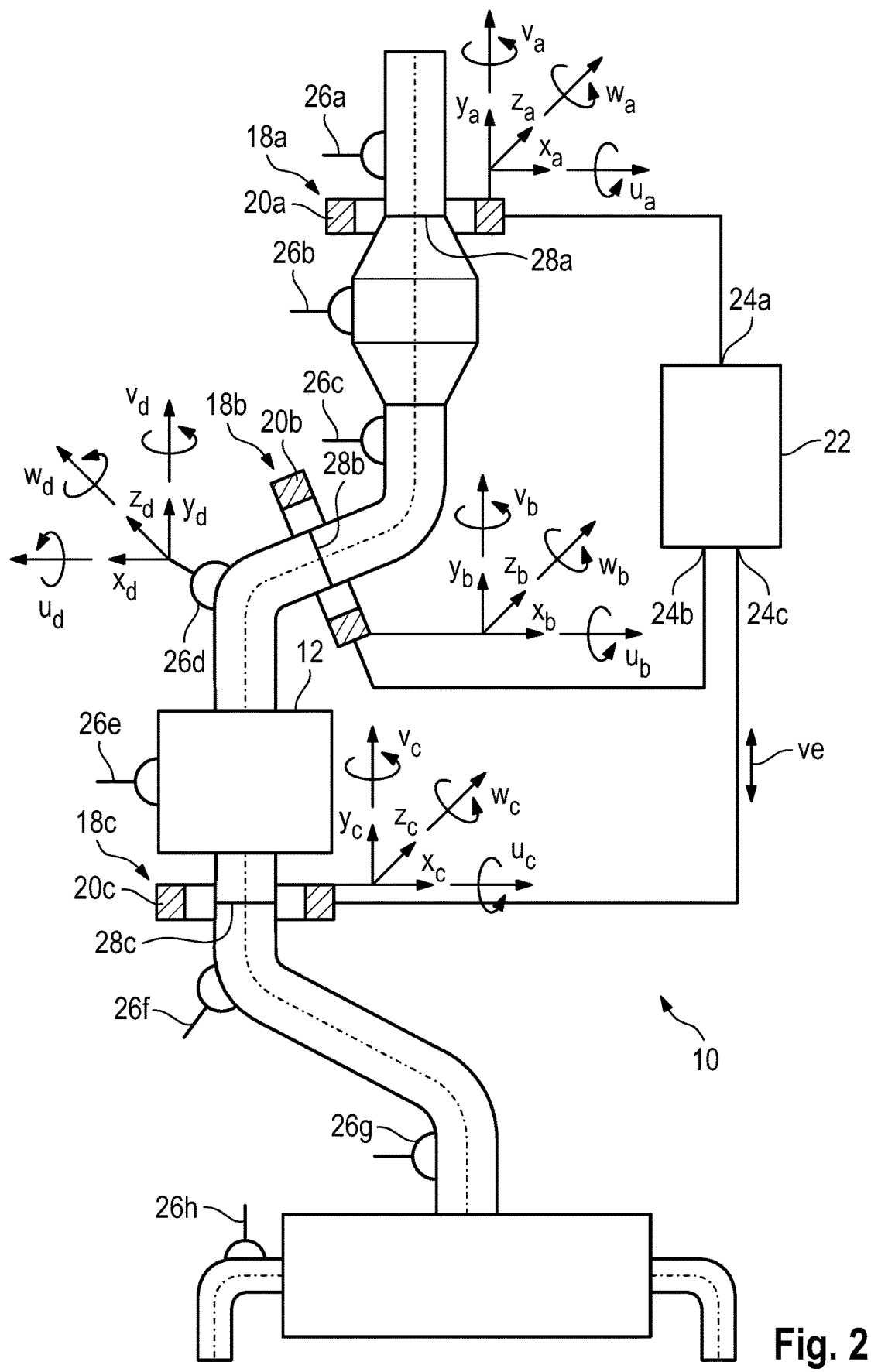
FIG. 2 illustrates in an abstracted and slightly modified schematic sketch, the joining device shown in FIG. 1.

In the illustrated embodiment, three joining units 18a, 18b, 18c that can be operated simultaneously are fastened on the frame 16 (cf. FIG. 2).

The joining units 18a-18c are induction soldering units and each comprise an inductor 20a, 20b, 20c that is illustrated in a schematic manner.

The joining units 18a-18c are arranged essentially one above the other in a vertical direction ve.

The joining device 10 comprises a soldering current generator 22 having three soldering current outputs 24a, 24b, 24c for operating the joining units 18a-18c.

Each of the soldering current outputs 24a-24c is coupled to one of the joining units 18a-18c. The number of the soldering current outputs 24a-24c in the illustrated embodiment therefore corresponds to the number of the joining units 18a-18c.

The joining units 18a-18c may each be positioned along the three translational axes x, y, z relative to the frame 16. The joining unit 18a may be positioned along the translational axes xa, ya, za, the joining unit 18b may be positioned along the translational axes xb, yb, zb, and the joining unit 18c may be positioned along the translational axes xc, yc, zc.

FIG. 2 illustrates schematically the translational axes x, y, z. These translational axes are arranged in pairs perpendicular to one another and are realized by virtue of linear drive units (not further illustrated) which each have an electrical drive.

Each of the joining units 18a-18c may also be positioned rotationally about allocated rotational axes u, v, w relative to the frame 16.

More precisely, the joining unit 18a may be positioned rotationally about the rotational axes ua, va, wa, the joining unit 18b may be positioned rotationally about the rotational axes ub, vb, wb, and the joining unit 18c may be positioned rotationally about the rotational axes uc, vc, wc.

For this purpose, the joining units 18a-18c each comprise electrical rotational adjustment drives (not further illustrated).

Moreover, clamping units 26a, 26b, 26c, 26d, 26e, 26f, 26g, 26h are provided in the joining device 10.

These clamping units 26a, 26b, 26c, 26d, 26e, 26f, 26g, 26h may be electrically actuated. In other words, they may be electrically activated and electrically deactivated. These clamping units 26a, 26b, 26c, 26d, 26e, 26f, 26g, 26h are schematically illustrated in FIG. 2 as vacuum suction cups. Nevertheless, other clamping technologies are also possible.

Each of the clamping units 26a-26h may also be adjusted in three rotational and three translational degrees of freedom to correspond with the joining units 18a-18c.

This is illustrated for the clamping units 26a-26h in an exemplary manner via the axes xd, yd, zd and ud, vd, wd on the clamping unit 26d. The remaining clamping units 26a-26c and 26e-26h may be adjusted in the same manner.

In order to produce the exhaust gas system 12 for an internal combustion engine (not illustrated) of a motor vehicle, initially the joining units 18a-18c of the joining device 10 are oriented to a geometry of the exhaust gas system 12 that is to be produced.

This occurs along one or multiple of the translational axes and/or rotational axes, in other words along one or multiple of the axes xa, ya, za, xb, yb, zb, xc, yc, zc, ua, va, wa, ub, vb, wb, uc, vc, wc.

The joining units 18a-18c are therefore oriented in six degrees of freedom within the space.

The same applies for the clamping units 26a-26h that are oriented along the exemplary axes xd, yd, zd and about the axes ud, vd, wd in six degrees of freedom within the space.

The components or assemblies of the exhaust gas systems are positioned in the joining device 10.

The components or assemblies form joining interfaces between one another, wherein three joining interfaces 28a, 28b, 28c are illustrated in FIG. 2 in an exemplary manner.

In the illustrated embodiment, the joining interfaces 28a-28c are arranged essentially vertically one above the other.

The components or assemblies are subsequently connected at the joining interfaces 28a-28c using an induction soldering method.

The number of joining units 18a-18c corresponds to the number of joining interfaces 28a-28c. It is therefore possible for all the joining interfaces 28a-28c to be processed simultaneously.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A joining device for producing an exhaust gas system for an internal combustion engine of a motor vehicle comprising:
a device base that is configured to be positioned on a hall floor;
a frame associated with the base; and
at least two joining units that can be operated simultaneously fastened to the frame, wherein the frame extends essentially vertically starting from the device base, and wherein the at least two joining units are configured to connect exhaust components of the exhaust gas system to one another.

2. The joining device of claim 1 wherein the joining units comprise induction soldering units and each comprise an inductor.

3. The joining device of claim 1 wherein each of the joining units is positionable along a translational axis or multiple translational axes relative to the frame.

4. The joining device of claim 1 wherein each of the joining units is positionable rotationally about a rotational axis or multiple rotational axes relative to the frame.

5. The joining device of claim 1 wherein the joining units are arranged essentially one above the other in a vertical direction.

6. The joining device of claim 1 including one or multiple clamping units.

7. The joining device of claim 6 wherein each of the clamping units is adjustable in three rotational and three translational degrees of freedom.

8. The joining device of claim 6 wherein the clamping units are electrically actuated.

9. The joining device of claim 1 including a soldering current generator having multiple soldering current outputs, wherein each soldering current output is coupled to at least one of the two joining units.

10. The joining device of claim 1 wherein a number of joining units corresponds to a number of joining interfaces of the exhaust gas system.

11. The joining device of claim 1 wherein the at least two joining units comprise three to fifteen joining units.

12. The joining device of claim 3, wherein each of the joining units is connected to the frame via three linear drive units that operate perpendicular to one another and each of the linear drive units comprises an electrical drive unit.

13. The joining device of claim 4, wherein each of the joining units is connected via three electrically rotational adjustment drives having rotational axes that operate perpendicular to one another to the frame.

14. The joining device of claim 6, wherein a number of clamping units corresponds to at least a number of components or assemblies of the exhaust gas system that are to be joined.

15. The joining device of claim 8, wherein the clamping units are electrically activated and electrically deactivated.

16. The joining device of claim 9, wherein a number of soldering current outputs corresponds to a number of joining units.

17. The joining device of claim 11, wherein the at least two joining units comprise five to twelve joining units.

18. The joining device of claim 1, wherein the joining device connects exhaust components of the exhaust gas system to one another.

19. The joining device of claim 18, wherein the exhaust components are configured to receive exhaust gases from an internal combustion engine.

20. The joining device of claim 6, wherein a number of clamping units corresponds to at least a number of exhaust components or assemblies of the exhaust gas system that are to be joined, and wherein the exhaust components or assemblies are held in the joining device via the clamping units.

* * * * *